United States Patent [19]

Tanikella

[11] Patent Number: 5,300,176

[45] Date of Patent: Apr. 5, 1994

[54] PROCESS OF PRODUCING SUBSTANTIALLY VOID-FREE POLYIMIDE COMPOSITES

[75] Inventor: Marty S. Tanikella, Wilmington, Del.

[73] Assignee: E. I. du Pont de Nemours and Company, Wilmington, Del.

[21] Appl. No.: 883,945

[22] Filed: May 15, 1992

[51] Int. Cl.$^5$ .................. B29C 65/00; B32B 31/00; B32B 31/26

[52] U.S. Cl. .................. 156/286; 156/87; 156/285; 156/307.1

[58] Field of Search .............. 156/87, 242, 243, 285, 156/286, 307.1, 307.5; 428/408, 375; 528/182, 183

[56] References Cited

U.S. PATENT DOCUMENTS

| | | | |
|---|---|---|---|
| 3,565,549 | 2/1971 | Lubowitz et al. | 528/182 |
| 3,697,308 | 10/1971 | Lubowitz et al. | 528/183 |
| 4,471,022 | 9/1984 | McGregor et al. | 428/375 |
| 4,601,945 | 7/1986 | Pike | 428/408 |
| 4,837,299 | 6/1989 | Peters et al. | 528/353 |
| 4,898,754 | 2/1990 | Christensen et al. | 427/369 |

*Primary Examiner*—James D. Withers

[57] ABSTRACT

Presence of small amounts of certain strongly basic amines in polymerization mixture during composite formation results in void reduction.

3 Claims, No Drawings

PROCESS OF PRODUCING SUBSTANTIALLY VOID-FREE POLYIMIDE COMPOSITES

BACKGROUND OF THE INVENTION

Organic polymers must have a high softening point, e.g., a high glass transition temperature (Tg) to retain adequate mechanical properties for a useful lifetime at expected service temperatures. Prior art composites prepared from stoichiometrically balanced aromatic polyimide precursors and reinforcing substrates while theoretically affording the highest glass transition temperatures, have a void level that adversely affects mechanical properties and specifically compression properties. To ameliorate the problem various techniques have been employed, some of which require additional or more costly processing steps. The use of monomeric or low molecular weight prepolymer solutions facilitates impregnation of fiber structures, however, it still remains difficult to complete polymerization and devolatilization with the "wet" prepreg while achieving essentially complete consolidation, or compaction. This, in turn, has made it difficult to routinely produce high quality, low void, composite laminates with such resins, especially using the low to moderate pressure autoclaves which are typical of the aerospace industry composite manufacturing capability. The present invention is a new technique for achieving this objective in a simple manner.

SUMMARY OF THE INVENTION

The present invention provides a novel prepreg and an improved process for preparing a cured polyimide composite reinforced with a fibrous substrate comprising:

a. impregnating a fibrous substrate with a polyimide precursor solution comprising a substantially balanced stoichiometric mixture of an aromatic tetracarboxylic acid or functional equivalent thereof and at least one aromatic diamine in a solvent for the reactants and with a strongly basic tertiary or sterically hindered secondary amine in an amount of from 2.5 to 10.0 mol % based on the diamine component;

b. preparing prepreg from the impregnated fibrous substrate;

c. forming a multi-ply laminate of prepregs and heating the laminate under vacuum to reduce solvent and water and to a volatiles content of from about 4 to 6% by weight; and d. consolidating the laminate by hot-pressing under vacuum and curing the consolidated laminate.

DETAILED DESCRIPTION OF THE INVENTION

This invention provides polyimide matrix composites which are reinforced with fibrous substrates having glass transition temperatures, Tg, substantially the same as prior art composites of the same ingredients but having considerably lower void content. The lower void content is manifested by superior compression properties. The composites in general also exhibit higher flex strength, flex modulus and short beam shear.

In accordance with the invention, a solution is prepared comprising polyimide precursors, a solvent for the precursors and a "non-functional" strongly basic amine. The polyimide precursors are a combination of an aromatic diamine and an aromatic tetracarboxylic acid or functional equivalent thereof such as the dianhydride or the diester of the acid. One can employ as the acid component, pyromellitic acid, its diester or dianhydride (PMDA), 2,2-bis(3',4'-dicarboxyphenyl) hexafluoropropane (6FTA) or any of a number of other acid, acid-esters or anhydrides such as are disclosed in U.S. No. 4,837,299 and in the literature. As the aromatic diamine component, one may employ one or more diamines such as m-phenylene diamine (MPD), p-phenylene diamine (PPD), 4,4'-diaminodiphenyl ether, 3,4'-diaminodiphenyl ether or others. It is important that the acid component and the diamine be employed in substantially stoichiometric proportions since the object is to enable the resulting polyimide to reach the highest attainable Tg from these ingredients.

The solvent chosen for dissolving the precursors is not critical and may be ethanol, N-methyl pyrrolidone (NMP) or mixtures thereof. The solvent is generally employed in an amount constituting from 40 to 60 wt. % of the precursor-solvent solution. It is desirable that sufficient solvent be present to reduce the viscosity such that the fibrous substrate can be easily and completely impregnated. On the other hand, excess solvent is undesirable because of the extra costs involved in its removal.

The final ingredient to be incorporated into the solution is a strongly basic non-functional amine. By "non-functional" is meant a tertiary amine, such as tripropylamine (TPA), tributylamine (TBA) or a secondary amine, such as 2,2,6,6-tetramethylpyridine (TMP), that acts as a non-functional amine because of steric hindrance. These amines have a pKb of between about 2.8 to 5 and are employed in an amount of from 2.5 to 10 mol % based on the content of diamine component in the precursor mixture.

The fibrous substrate used as reinforcement may be woven fabric, nonwoven fabric, or unidirectional tape. In any event the reinforcement selected is not critical and may be any of those commonly used in the art typically made from carbon, glass or aramid fiber.

Prepreg is prepared by passing the fibrous substrate through the precursor-containing solution prepared as described above. The solution pick-up can be varied by the speed it is pulled through the bath and by squeezing out the excess between rollers. If desired, one may first impregnate the fibrous substrate with the polyimide precursor solution and subsequently incorporate the non-functional amine by spraying it on the soaked substrate. A precursor pick-up equivalent to about 40 wt. % of resin solids based on the weight of the impregnated substrate is a typical level. Resin solids as commonly understood is the impregnated polymer content after removal of solvent and water released by condensation of the precursors to form the polymer. For use as prepreg, the impregnated substrate is dried to a tacky state. The tacky product is cut to the desired size as is well known in the art. This tackiness of the prepreg assists in forming a multiply laminate.

A lay-up is prepared by stacking a plurality of the prepregs to the desired thickness and the laminate is B-staged as is understood in the art. For B-staging, the laminate is commonly placed in a vacuum bag and heated under vacuum. This removes most all of the solvent, where low boiling solvent such as ethanol is employed, and reduces the content of water which may be formed by condensation reaction of the precursors or in other ways. In any event, residual volatiles (solvent and water) should be reduced to a level of from about 4 to 6% by wt. based on the impregnated structure. This can be determined by Thermogravimetric Analysis. A volatiles content of about 4 to 6% for the B-staged product, while not critical, is preferred. Lower levels may cause difficulties in polymer flow during consolidation, while high volatile contents will require more time in the autoclave to remove the volatives, a more expensive operation.

The product of the B-stage is then consolidated by being placed in an autoclave or press in which it is heated under vacuum while under pressure. This operation consolidates the laminate by causing the resin to flow into voids Any solvent which may be present and water from further condensation is drawn off by the vacuum. This is essential if high void content is to be avoided. The temperatures selected and period of heating will depend on the solvent employed and the content of volatiles, as is well-known in the art.

Finally, the consolidated product is cured by heating to a higher temperature. The cure is normally conducted for a time sufficient to approach the maximum Tg attainable with the polyimide.

TEST PROCEDURES

Compression Properties reported as IITRI Compression, in KSI were determined by ASTM D-3410.

Flex strength, KSI and flex modulus, MSI, were measured by ASTMD-790.

Short Beam Shear, KSI, was measured by ASTMD-2344.

% Voids were measured by ASTM-7240.

Glass transition temperature, Tg, was measured using a Du Pont 9900 TA system with a model 983 DMA module.

The following examples are illustrative of the present invention and are not to be construed as limiting.

EXAMPLE 1

This example illustrates practice of the invention to make low void composite panels.

To 4107 g. of a polyimide precursor solution was added 22.6 g. tri-n-propylamine (TPA). The polyimide precursor or binder solution, consisted essentially of a substantially balanced stoichiometric mixture of 6 FTA with a mixture of PPD 95% and MPD 5% in a solvent (ethanol, NMP or a mixture thereof or others for the precursors). It is prepared by charging the solvent into a reactor, heating to about 50° C., adding the 6FTA and with constant stirring, raising the temperature and maintaining it at 80° to 90° C. The diamines are added with stirring while maintaining the temperature at about 80° C. for about an hour. The solution contained 48% cured resin solids after accounting for the solvent content and water of condensation. The TPA is calculated as 4.73 mole % based on the diamine component of the binder solution.

A prepreg was made by impregnating a woven (24×24) carbon fabric, 3000 filament yarn, 8 HS (harness satin weave) with the binder solution prepared as described above. It contained 40% by wt. of resin solids, 15.5% by wt. of volatiles and had an areal wt. of 360 g/m.

A complex composite structure was then prepared from the above prepreg. The composite structure is curved and has thicknesses varying from 150 mil (10 ply) to 450 mil (30 ply). The structure was built by laying up ten 10 inch ×10 inch plies of prepreg and adding twenty plies of prepreg for a total of thirty plies in a 6 inch ×8 inch area. In this particular example each ply of the prepreg was sprayed with ≈2 wt. % of N-methyl pyrrolidone (NMP) as plies were being laid-up. The overall result was the solvents ethanol and NMP were in 90/10 weight ratio. The prepreg plies were vacuum (28"Hg) debulked after each 2 plies were laid down with the first 10 plies (10 inch ×10 inch) and then vacuum (28 inch Hg) debulked after each 4 plies with the next 20 plies (6 inch ×8 inch) with a period of 1 minute for each debulking. The preform was laid-up for vacuum bag autoclave processing by a conventional arrangement as described below.

A steel tool is coated with release agent and then sprayed with dry graphite. The prepreg plies were then laid-up as described above. The laminate was then B-staged in a vacuum bag with 2" Hg vacuum for 1 hour at 75° C. and 8 hours at 90° C. A layer of plastic screening (Cellgard) was then laid over the laminate and steel walls (edge dams) were placed around the 10 inch ×10 inch ply prepreg lay-up to prevent lateral flow.

The above B-staged preform was processed in a 3'×5' autoclave. The cycle used was 1° F./minute heat-up rate from room temperature to 680° F. (360° C.) under full (29" Hg) vacuum. At 680° F. (360° C.) 500 psi pressure was applied and held and the heat-up continued at 1° F./minute until 752° F. (400° C.). It was then held at 752° F.(400° C.) and 500 psi for 2 hours. The autoclave was then cooled to 280° F. at a rate of 3° F./minute, and then cooled rapidly to room temperature with release of pressure.

The composite structure produced in this matter was subjected to numerous tests with the following results:

The density measured was 1.60 g/cc.

| No. of Plies | Thickness | % Voids |
| --- | --- | --- |
| 10 | 150 | 1.70, 1.71 |
| 30 | 450 | 2.28, 2.05 |

A 10 inch ×10 inch 10 ply (150 mil) flat composite panel was also made in the same autoclave run. It had a Tg of 358° C. It will be noted that the complex structure lay-up was placed on the steel tool and that no breather fabric was used between the tool and the lay-up. Had breather fabric been used, a lower void content could be expected.

EXAMPLE 2

The procedure followed in this example is the same as used in Example 1 except that 350 psi was used in the autoclave cure cycle. A ten ply flat 10 inch by 10 inch composite panel was made in the same autoclave run.

The properties of the 150 mil (10 ply) to 450 mil (30 ply) complex structure were:

| No. of Plies | Thickness | % Voids |
| --- | --- | --- |
| 10 | 150 | 2.34, 2.16 |
| 30 | 450 | 2.85, 3.19 |

The properties measured on the 10 ply, 10 inch ×10 inch flat panel were:

| | |
| --- | --- |
| Tg (DMA): | 353° C. |
| Density: | 1.58 g/cc |
| % voids: | 2.31, 2.45 |
| Mechanical properties: | |

| -continued | |
|---|---|
| Flex strength: | 94 kpsi |
| Flex modulus: | 7.7 kpsi |
| Short beam shear: | 8.7 kpsi |

EXAMPLE 3

This example illustrates the use of 2,2,6,6-Tetramethyl Piperidine (TMP)—which is a sterically hindered strongly basic secondary amine as additive to the binder solution.

An ethanol solution of TMP was made and sprayed on both sides of each ply of prepreg (plain weave carbon fabric impregnated with the polyamide precursor solution of Example 1) so that TMP was 25 wt. % based on the total solvent (ethanol) in the prepreg. This is the test item. For the control only ethanol was sprayed on each ply in a similar fashion.

Twelve ply laminates were made from each of the above two prepreg types and cured in a press using the following conditions:

Heat to 60° C. (press temp) over 5 minutes under 10 inch Hg vacuum. Heat up to 100° C. over 25 minutes and up to 130° C. over 20 minutes and then hold for 15 minutes at 130° C. The laminate temperature (thermocouple) was 122° C. Apply 15 inch Hg vacuum and heat to 165° C. over 35 minutes. Hold for 15 minutes at 165° C. (laminate temperature 152°–153° C.) and then apply full vacuum at about 30 in. of Hg. Heat to 385° C. over 4 hours and apply 200 psi pressure at 220° C. Hold 2 hours at 385° C. (laminate temp. was 364° C.) and cool in air to 150° C. over 1 hour. Water cool to 90° C. and remove hot from the press.

The above cured panels have the following properties:

| Composite Properties | | |
|---|---|---|
| C-Scan DB Loss | Tg °C. (DMA) | Density (g/cc) |
| 2–4 | 356 | 1.52 |
| 14–22 | 352 | 1.45 |

As can be seen, the test panel was of superior quality. The C-Scan DB (decibel) Loss value is determined by ultrasonic sound waves impinging on the composite panel and measuring their amplitude losses. The higher values indicate greater void content.

EXAMPLE 4

This example illustrates the use of tri-n-propylamine (TPA) and tri-n-butylamine (TBA)—which are non-functional strongly basic tertiary amines in making low void composites. The experimental details are similar to Example 3, except that 16 plies were used.

The results are described below:

| | Avimid ® N Composites Properties | | |
|---|---|---|---|
| Sample | C-Scan DB Loss | Tg °C. (DMA) | Density (g/cc) |
| TPA test item | 2–6 | 330 | 1.59 |
| Control | 14–28 | 353 | 1.50 |
| TBA test item | 206 | — | 1.58 |

I claim:

1. A process for preparing a substantially void-free cured polyimide composite reinforced with a fibrous substrate comprising:
   a. impregnating a fibrous substrate with a polyimide precursor solution comprising a substantially balanced stoichiometric mixture of an aromatic tetracarboxylic acid, the dianhydride or diester thereof and at least one aromatic diamine in a solvent therefor, said solvent constituting from 40 to 60% by weight of the precursor-solvent solution, and with a strongly basic tertiary or sterically hindered secondary amine having a pKb of between 2.8 and 5 in an amount of from 2.5 to 10.0 mol % based on the diamine component;
   b. preparing prepreg from the impregnated fibrous substrate;
   c. forming a multi-ply laminate of prepregs and heating the laminate under vacuum to reduce solvent and water to a volatiles content of from about 4 to 6% by weight; and
   d. consolidating the laminate by hot-pressing under vacuum and curing the consolidated laminate.

2. A process according to claim 1 wherein the strongly basic tertiary amine is tri-n-propylamine.

3. A process according to claim 1 wherein the sterically hindered amine is 2,2,6,6-tetramethyl piperidine.

* * * * *